US006963116B2

(12) United States Patent
Kawahito

(10) Patent No.: US 6,963,116 B2
(45) Date of Patent: Nov. 8, 2005

(54) HIGH-SPEED IMAGE SENSING DEVICE

(75) Inventor: Shoji Kawahito, Hamamatsu (JP)

(73) Assignee: President of Shizuoka University, Shizuoka (JP)

( * ) Notice: Subject to any disclaimer, the term of this patent is extended or adjusted under 35 U.S.C. 154(b) by 111 days.

(21) Appl. No.: 10/740,550

(22) Filed: Dec. 22, 2003

(65) Prior Publication Data
US 2005/0040485 A1    Feb. 24, 2005

(30) Foreign Application Priority Data
Aug. 19, 2003  (JP) .............................. 2003-295027

(51) Int. Cl.[7] .......................................... H01L 27/14
(52) U.S. Cl. ................................................ 257/414
(58) Field of Search ........................... 257/184, 187, 257/225, 231, 290, 291, 292

(56) References Cited

U.S. PATENT DOCUMENTS 6,818,933 B2 *   11/2004   Henderson et al. ......... 257/290

* cited by examiner

Primary Examiner—David Nelms
Assistant Examiner—Mai-Huong Tran
(74) Attorney, Agent, or Firm—Westerman, Hattori, Daniels & Adrian, LLP

(57) ABSTRACT

It is ideal to amplify voltage within a pixel to obtain sufficient sensitivity and low noise characteristics in a short storing time in order to acquire high-speed images, but no method has existed to satisfy the three requirements of the electronic shutter operation, removal of reset noise and signal voltage amplification. To solve this problem, the present invention takes the ratio of the capacitor C1 at point V1 and capacitor C2 at point V2 to be large, and transfers charges from V1 to V2, thereby enabling the signal voltage to be amplified. Moreover, the reset noise component sampled and included in VFD0 before opening TX is the same amount as the reset noise included in the voltage after TX is opened and the ΔVFD of change occurred, so the reset noise is removed by taking out the amount of change ΔVFD and amplifying the signal voltage. By returning R to 3V, the charge injection from the section V1 does not occur, thereby the voltage of V2 is held as is, and enters into storage status. Being executed in all the pixels at the same timing, these operations play the role of the electronic shutter.

6 Claims, 13 Drawing Sheets

HIGH-SPEED IMAGE SENSING DEVICE

BACKGROUND OF THE INVENTION

1. Field of the Invention

The present invention relates to a pixel circuit of a high-speed CMOS image sensor.

2. Description of the Related Art

In a general pixel circuit of a CMOS image sensor, signal charges are stored and read, then signal charges are initialized (reset) for each horizontal line. Since the start timing of reset and the start of signal charging differ depending on the horizontal line, distortion occurs in an image which has a large movement. A CCD image sensor, on the other hand, can reset all the pixels at the same time and start signal storing at the same time. This is called an "electronic shutter operation" or "global shutter".

Conventional methods for performing an electronic shutter operation using a CMOS image sensor are a method disclosed in U.S. Pat. No. 5,986,297, "Color active pixel sensor with electronic shuttering, anti-blooming, and low cross-talk", and a method disclosed in Kokai publication No. 2000-504489 (cf. WO 97/28558), "Active pixel sensor array comprising electronic shutter operation".

SUMMARY OF THE INVENTION

A high-speed image sensor has remarkable improvements in performance due to the recent advancements in CMOS image sensor technology, but also has some problems. For a high-speed image sensor in the future, the following is demanded particularly in the functions and performance of the pixel section.
(1) an all pixel simultaneous shutter function
(2) low noise level
(3) signal voltage can be amplified within a pixel and signal voltage possesses sufficient sensitivity
(4) circuit configuration is simple, and a sufficient fill factor can be secured The present invention provides a pixel circuit of a high-speed CMOS image sensor which can satisfy these demands.

The present invention allows implementing the electronic shutter operation, a reset noise reduction, and a voltage amplification within a pixel using a simple circuit.

DESCRIPTION OF THE PREFERRED EMBODIMENTS

Figure 1:
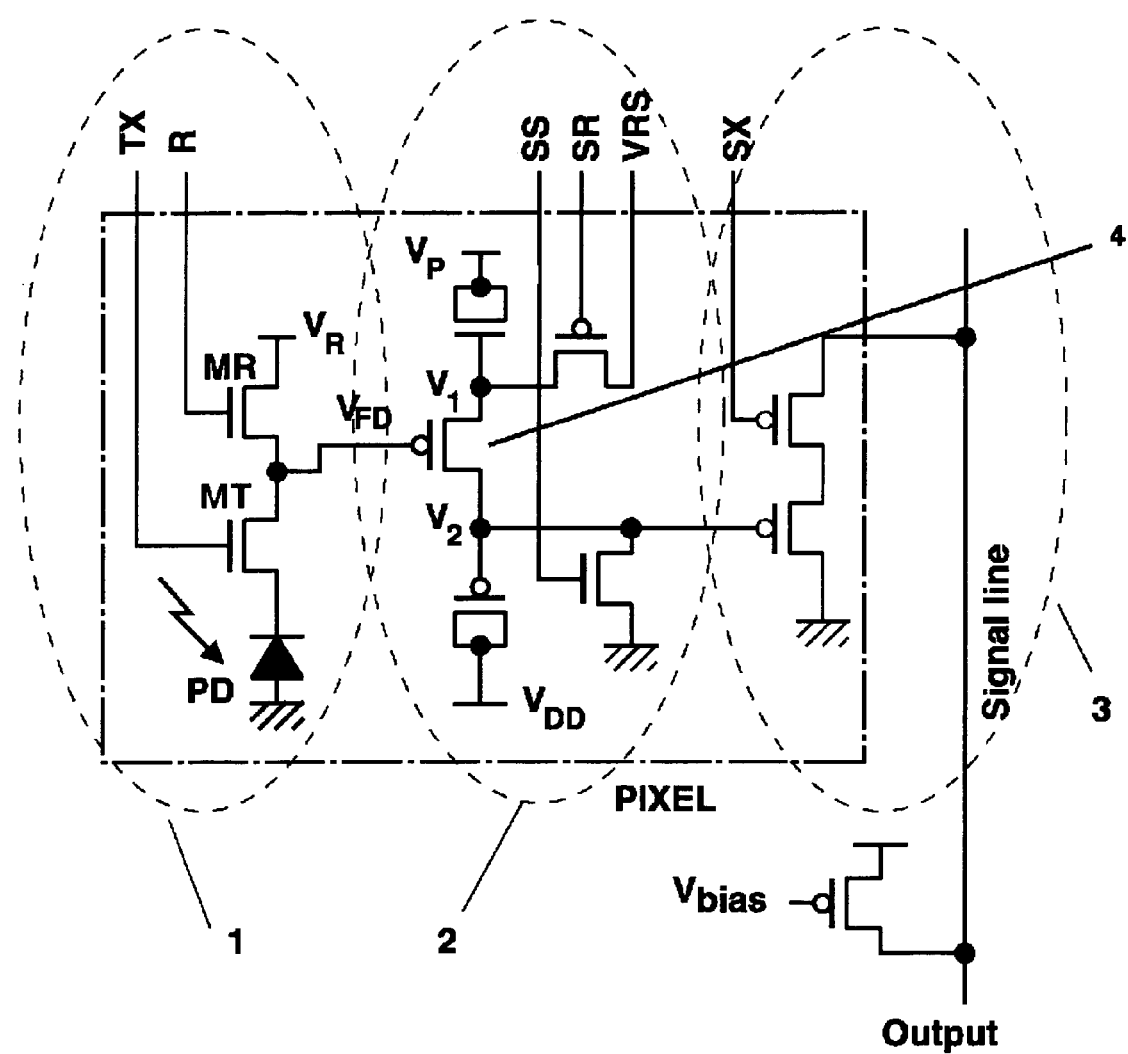
FIG. 1 is a diagram depicting a pixel circuit for performing voltage amplification, noise reduction and electronic shutter operation within a pixel.

FIG. 1 shows a concrete example of the circuit according to the present invention. The section indicated by 1 is comprised of a photo-diode PD as a photo-electric conversion element, a transfer gate transistor MT, and reset transistor MR. The charges generated by the irradiation of light in the cathode section of the photo-diode are stored, and the charges Q are transferred to the section indicated by $V_{FD}$ by operating the control line TX (hereafter referred to as "TX"). If the parasitic capacitance generated in the $V_{FD}$ section at this time is $C_{FD}$, then a signal voltage change corresponding to $Q/C_{FD}$ is generated. The section indicated by 1 corresponds to the section indicated by 1 of the conventional 4-transistor pixel circuit shown in FIG. 2. For this section of the photo-diode, a pinned photo-diode may be used. In the conventional 4-transistor pixel circuit, the voltage of $V_{FD}$ is directly read out using the buffer circuit comprising n-channel transistors MIN and MX and the current source load transistor which is connected to the vertical signal line. In the present invention, the signal for which the electronic shutter operation, voltage amplification and reset noise reduction were performed in the section indicated by 2 in FIG. 1 is read out using the buffer circuit and the current source load transistor in the section indicated by 3 in FIG. 1. For the buffer circuit in section 3, a p-channel transistor is used since the output voltage in section 2 is at low voltage level. The control line SX is for controlling the output gate of the buffer circuit.

EXAMPLE 1

Figure 3:
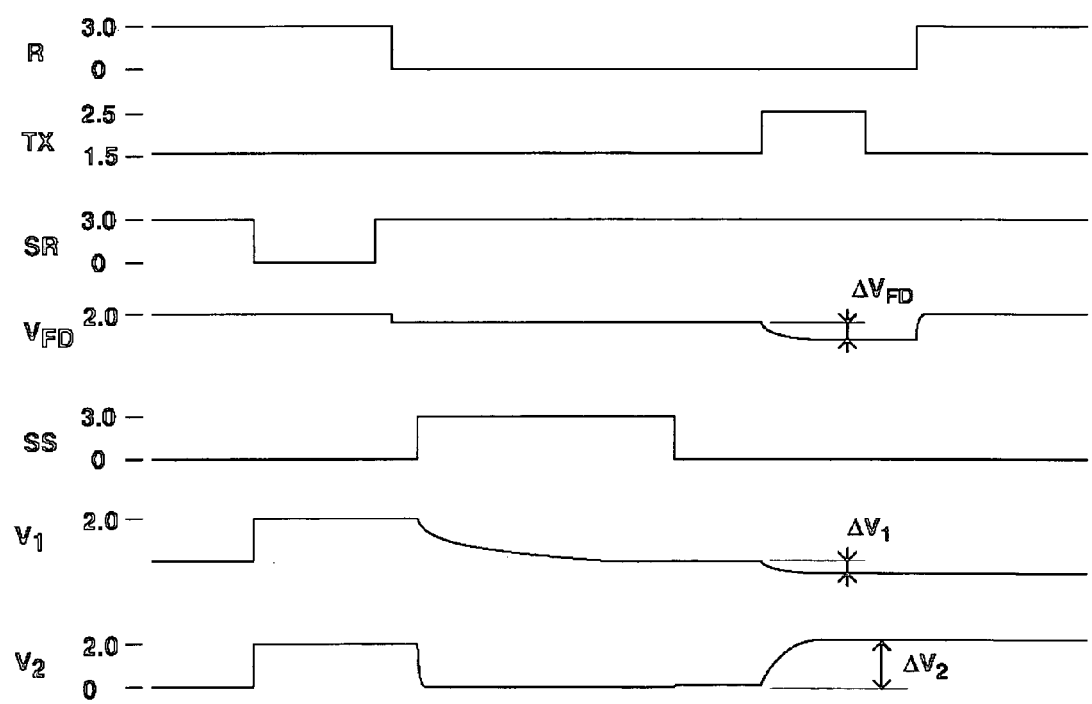
FIG. 3 is a diagram depicting the timing of the electronic shutter operation of the circuit in FIG. 1.

FIG. 3 shows a diagram depicting the operation when circuits 1 and 2 are combined. To simplify explanation, a concrete value of voltage is used, but the voltage] to be used is not limited to the voltage used here. When the control line R (hereafter referred to as "R") is 3V at first, the reset transistor MR is ON, and the voltage of $V_{FD}$ is at reset voltage $V_R$ (2.0V in this case). In this status, the control line SR (hereafter referred to as "SR") is changed from 3V to 0V, and the voltage of $V_1$ is set to $V_{RS}$ (about 2.0V). At this time, the voltage of $V_2$ rises to the voltage of $V_{RS}$. Then SR is returned to 3V and R is set to 0V.

In this case, the voltage of $V_{FD}$ becomes a voltage slightly lower than the reset voltage $V_R$ due to feed through, and the voltage of $V_{FD}$ at this time becomes $V_{FD0}$. This $V_{FD0}$ includes a reset noise component which is generated by thermal noise, and remains as electric charges. Then the voltage of $V_2$ is dropped to 0V by setting the control line SS (hereafter referred to as "SS") from 0V to 3V, and by this, the charges stored at section $V_1$ flow over the potential barrier created by the p-channel MOS transistor 4 and move to the $V_2$ side, and the voltage of $V_1$ gradually drops. Then SS is returned to 0V. In this stage, preparation for signal amplification, electronic shutter and reset noise reduction operations complete.

Then when TX is raised from 1.5V to 2.5V, the charges stored by the photo-diode are transferred to the $V_{FD}$ side, and the voltage thereof drops. The amount of this voltage change is assumed to be $\Delta V_{FD}$. By this, the potential barrier of the p-channel MOS transistor 4 becomes low, and charges flow from $V_1$ to $V_2$, and the voltage of $V_1$ drops. The amount of this voltage change is $\Delta V_1$, which is ideally equal to $\Delta V_{FD}$, but is smaller than $\Delta V_{FD}$ since the rate of change of the surface potential of the channel with respect to the gate voltage of the p-channel MOS transistor 4 is not 1. If this ratio is α, then $$\Delta V_1 = \alpha \Delta V_{FD} \quad \text{[Formula 1]}$$

When the capacitance at the point of $V_1$ is $C_1$, the charge amount $\Delta Q_1$, which flows out by the change of voltage of $V_1$ is $$\Delta Q_1 = C_1 \Delta V_1 \quad \text{[Formula 2]}$$

If the change of $V_2$ generated by the charge flowing out to the $V_2$ side is $\Delta V_2$ and the capacitance at the point $V_2$ is $C_2$, then $$\Delta V_2 = \Delta Q_1 / C_2 \quad \text{[Formula 3]}$$

therefore $$\Delta V_2 / \Delta V_{FD} = \alpha \cdot C_1 / C_2 \quad \text{[Formula 4]}$$

Since α is a value around 0.7–0.8, the signal voltage can be amplified by taking the ratio of $C_1$ and $C_2$ to be large. Also the change of $V_2$ is in proportion to the changed amount of $V_{FD}$, so the reset noise generated at $V_{FD}$ can be removed. In other words, the reset noise, which is the same amount of reset noise component sampled and included in the $V_{FD0}$ before opening TX, is included in the voltage after TX is opened and a $\Delta V_{FD}$ change occurs. So the reset noise is removed by taking out the changed amount $\Delta V_{FD}$ and amplifying it. Also by returning R to 3V after the signal is amplified at $V_2$, the potential barrier of the p-channel MOS transistor 4 becomes high, a charge injection from the $V_1$ section does not occur, and the voltage of $V_2$ is maintained as is. In other words, a stored status occurs. These operations are executed at the same timing in all the pixels, and the storage time can be set arbitrarily, so these operations can play the role of the electronic shutter. Therefore signals from the pixels can be captured simultaneously within one frame, and moving images with little blurring and distortion can be acquired.

The p-channel MOS transistor 4 operates in the weak inversion region, and a flow out of charges is generated by the diffusion of carriers, so it takes a long time until the flow out becomes completely zero. If the next operation is begun in a status where the flow out is not zero, non-linearity is generated. Therefore another possible method is to apply the pulse voltage, of which the initial voltage is about 0V to several tens mV, to $V_P$, so as to accelerate the flow out of charges from $V_1$.

In the above description, the MOS transistor 4, which is the MOS transistor for supplying charges from the power supply voltage VRS to the point $V_1$, and the MOS transistor of the output buffer, are p-channel types, and the other MOS transistors are n-channel types. Most MOS transistors however are operating as transfer gates, and an n-channel type can be used instead of a p-channel type, or vice versa, which is obvious to experts in this field. This is also the same for the MOS transistors of the signal line.

And it is also a matter of course that the polarity of control signals must be considered when a different conductive type MOS transistor is used.

In FIG. 1, $C_1$ is created by the gate capacitance of the n-channel MOS transistor, and $C_2$ is created by the gate capacitance of the p-channel MOS transistor, so the former gate voltage for operation is a high voltage, around 2–3V, and the latter gate voltage is a low voltage, about 0V to 1V. Therefore a transistor operates in a strong inversion status where the gate oxide film capacitance can be used, which is a capacitance that depends little on voltage.

Figure 2:
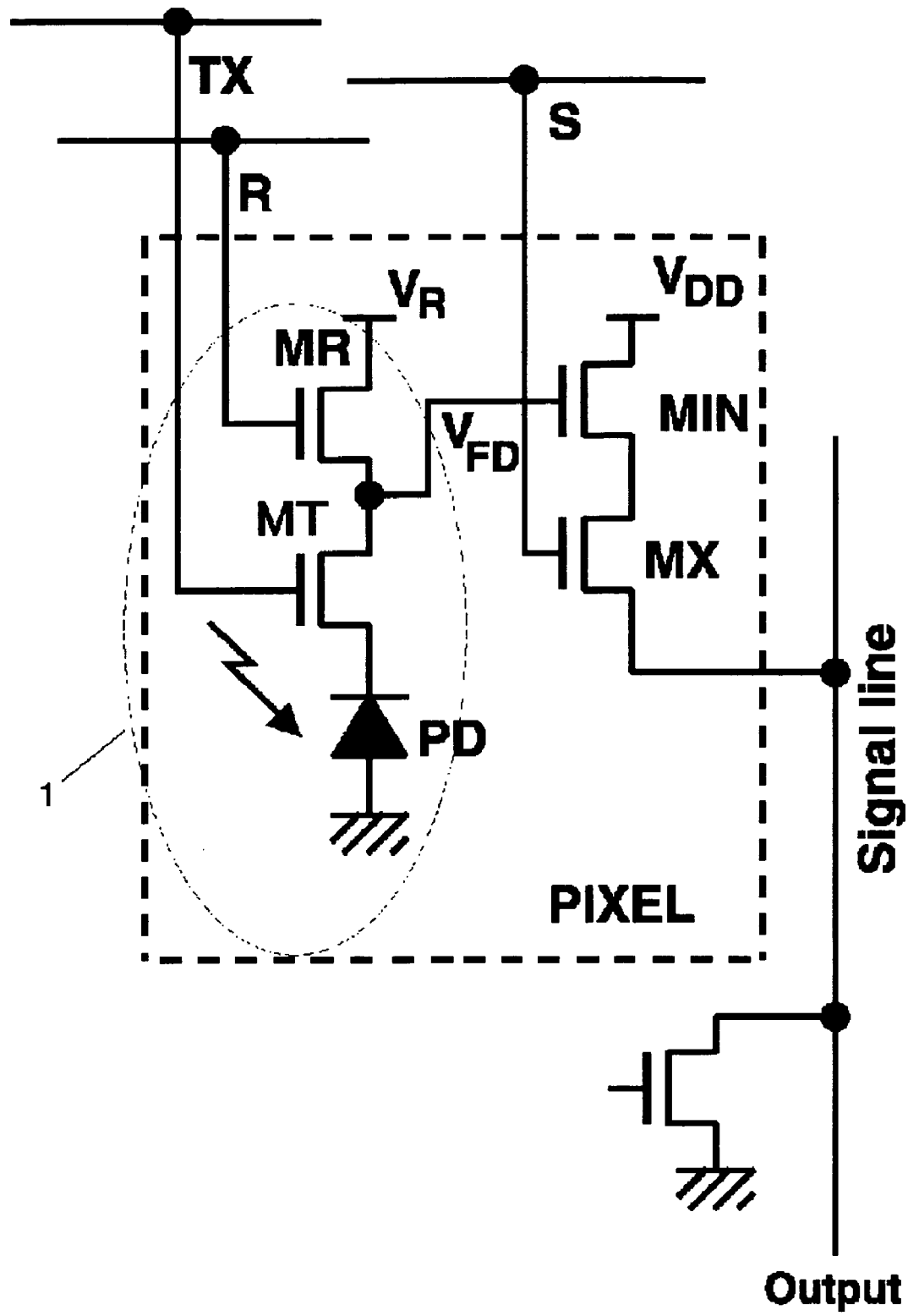
FIG. 2 is a diagram depicting a conventional 4-transistor pixel circuit.
Figure 4:
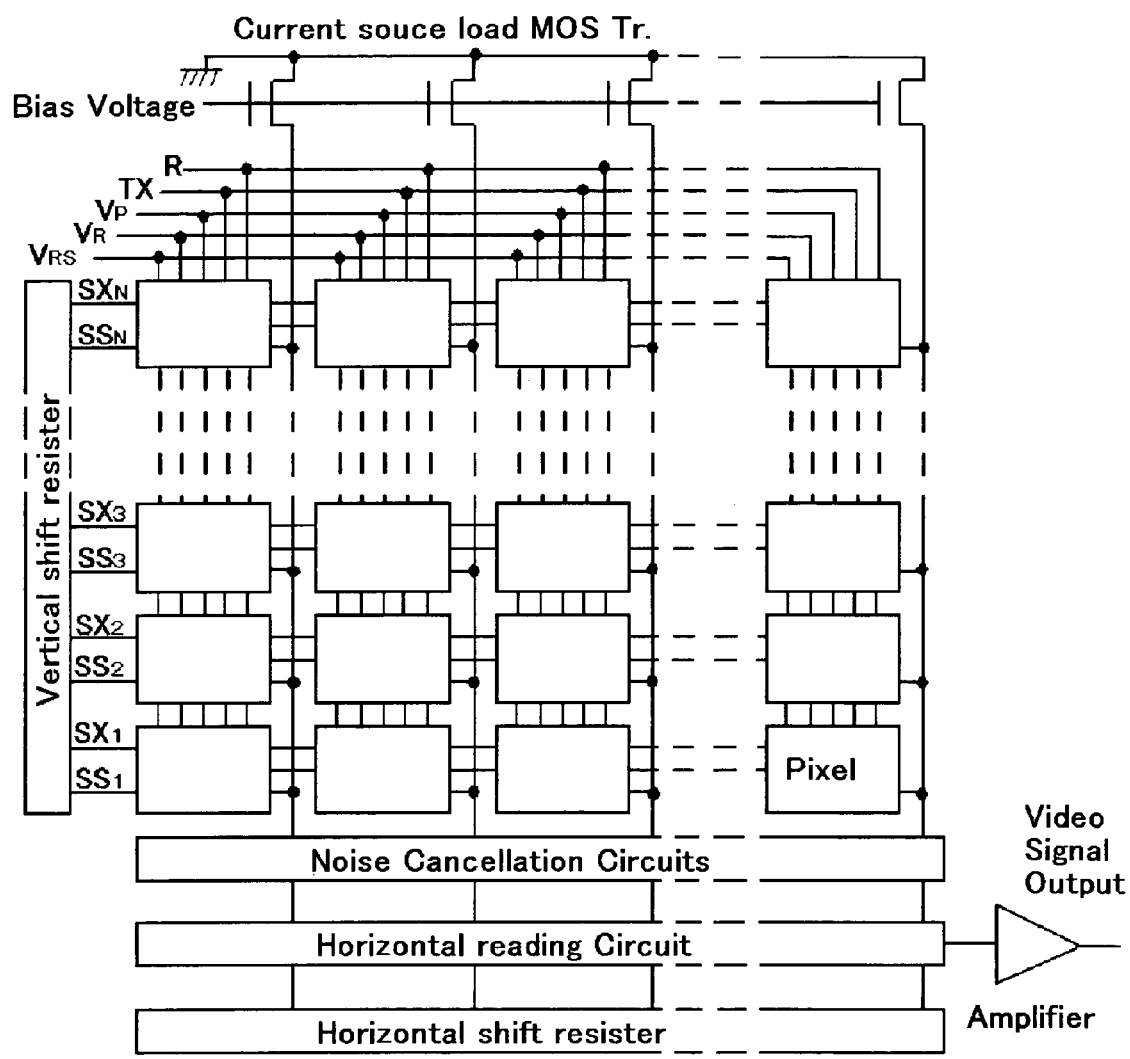
FIG. 4 is a diagram depicting a configuration of an entire image sensor (single output) which has a synchronous shutter function.
Figure 5:
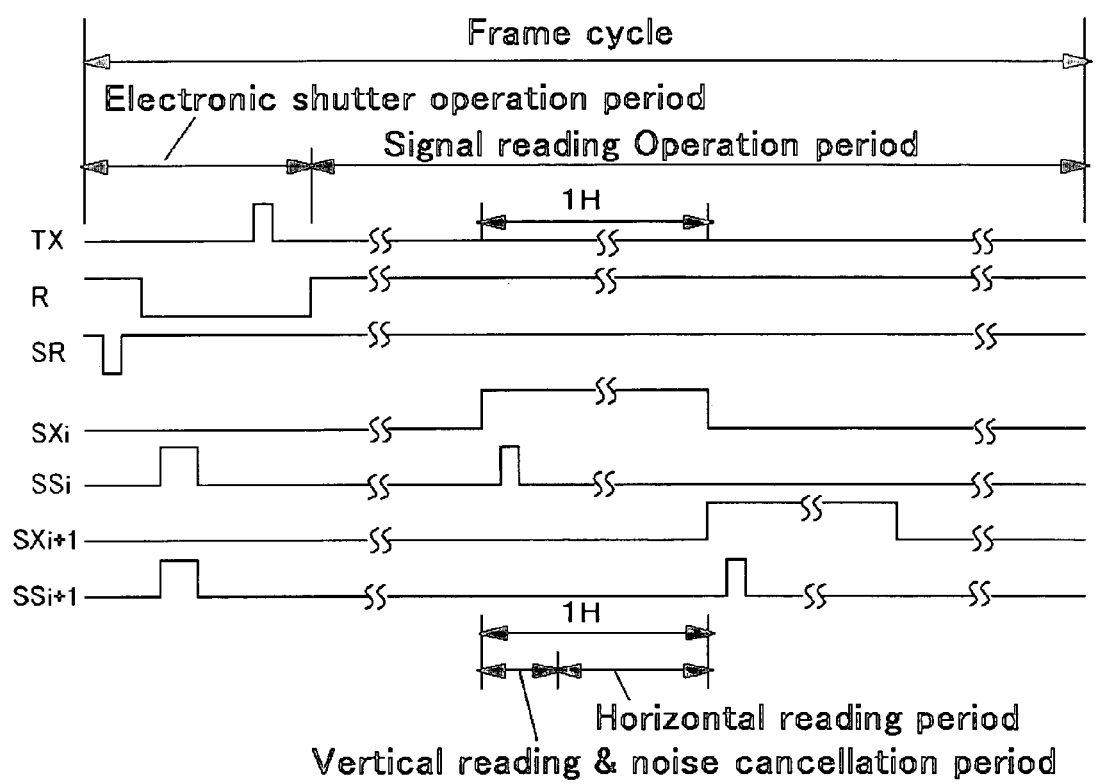
FIG. 5 is a diagram depicting the operation timing of the circuit in FIG. 4.

FIG. 4 shows the configuration of the entire image sensor where the circuit in FIG. 2 is used for the pixel section. FIG. 5 is the timing chart thereof. According to the above described operation, electronic shutter, amplification and noise cancellation operations are performed by each control signal R, TX and SS, and for the output signal thereof (V2 in FIG. 1), vertical reading and horizontal reading are performed for each row using the control signals ($SS_i$, $SX_i$) which are output from the vertical shift register, and the result is output to the outside. During vertical reading, the noise cancellation operation for removing fixed pattern noise, which is generated due to the characteristic dispersion of the buffer amplifier at the section indicated by 3 in FIG. 2, is performed by the noise cancellation circuit. For the selection for reading, SX of the pixel in the horizontal line is set to 0V, and the voltage of $V_2$ is read by this. For noise cancellation, the voltage of $V_2$ is read, then SS of the horizontal line is set to 3V to set $V_2$ of the pixel section to 0V, since SS was also used for the electronic shutter operation. By the noise cancellation circuit, the difference of the voltage of $V_2$ which was read and the voltage when $V_2$ is set to 0V is determined so as to acquire the amount of change $\Delta V_2$ of the voltage of $V_2$, and the fixed pattern noise generated by the buffer amplifier can be removed. For the noise cancellation circuit, a generally used noise cancellation circuit for image sensors can be used, and description thereof is omitted here since there are no specific features unique to the present invention.

Figure 7:
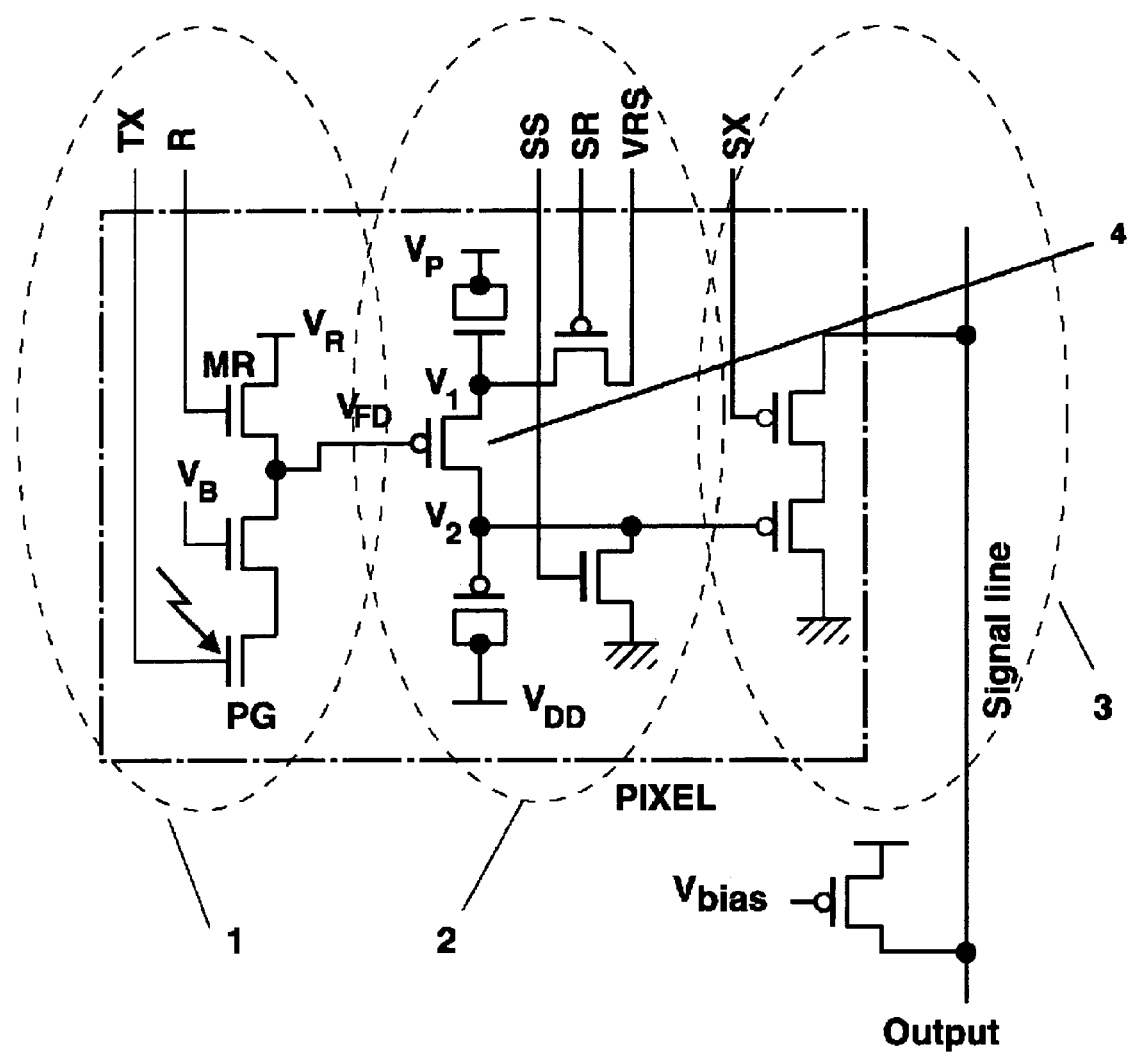
FIG. 7 is a diagram depicting a pixel circuit which has an electronic shutter operation, voltage amplification and noise cancellation function when a photo-gate is used as a photo-electric conversion element.

FIG. 7 shows a configuration when a high-speed image sensor is implemented using the circuit in FIG. 1. After noise cancellation, horizontal scanning is not performed, but A/D conversion is performed in parallel using many A/D converters lined up, and digital output is allocated to a plurality of output lines in time division via the multiplexer, and is output in parallel.

The above configuration can be applied when the photo-gate shown in FIG. 7 is used. The difference in this case, however, is that high voltage (e.g. 3V) is applied to TX when charges are stored, and low voltage (e.g. 0V) is applied when charges are transferred.

EXAMPLE 2

Figure 8:
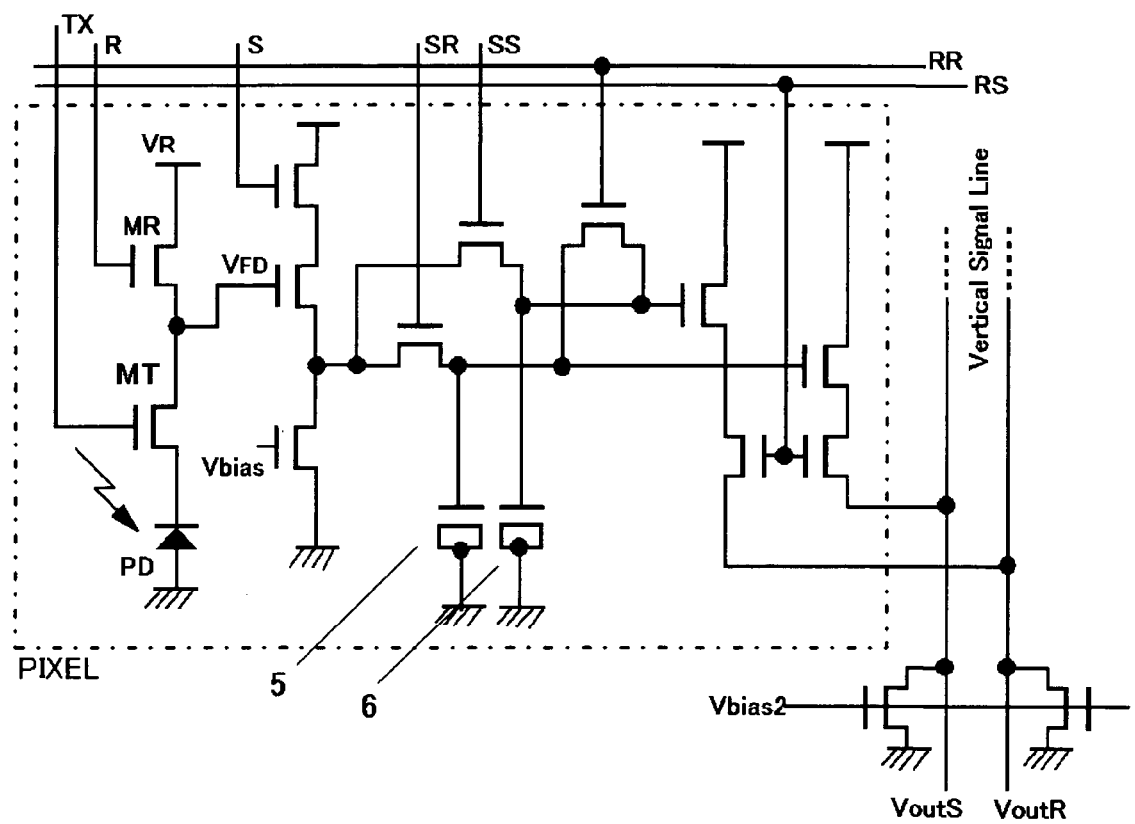
FIG. 8 is a diagram depicting a pixel circuit which has an electronic shutter operation and noise cancellation function (No. 2)

FIG. 8 shows another pixel circuit which has an electronic shutter operation and reset noise and fixed pattern noise removal functions.

At first, R is set to High to turn the reset transistor ON, and VFD is set to reset voltage VR. The voltage at this time is read via the source follower buffer, and is stored in the transistor for capacitance 5 by setting SR to High. Then TX is opened and the voltage of VFD is changed (dropped) by transferring the signal charges to the VFD section. This voltage is read via the source follower buffer, and SS is set to High to store it in the transistor for capacitance 6. An electronic shutter operation is performed by executing this storage operation simultaneously for all the pixels. In the case of this circuit as well, a system using photo-gates instead of photo-diodes is possible.

S in FIG. 8 is a control signal for decreasing power consumption by cutting the current that flows through the source follower circuit when reading is not performed, and the transistor to which S is connected is a switch for this operation.

The signals stored for the two capacitors are read out to outside the image array via the respective buffer circuits. Selection for reading out is executing by setting RS to High. By this read out operation, fixed pattern noise due to the dispersion of the circuits and reset noise are cancelled.

Figure 9:
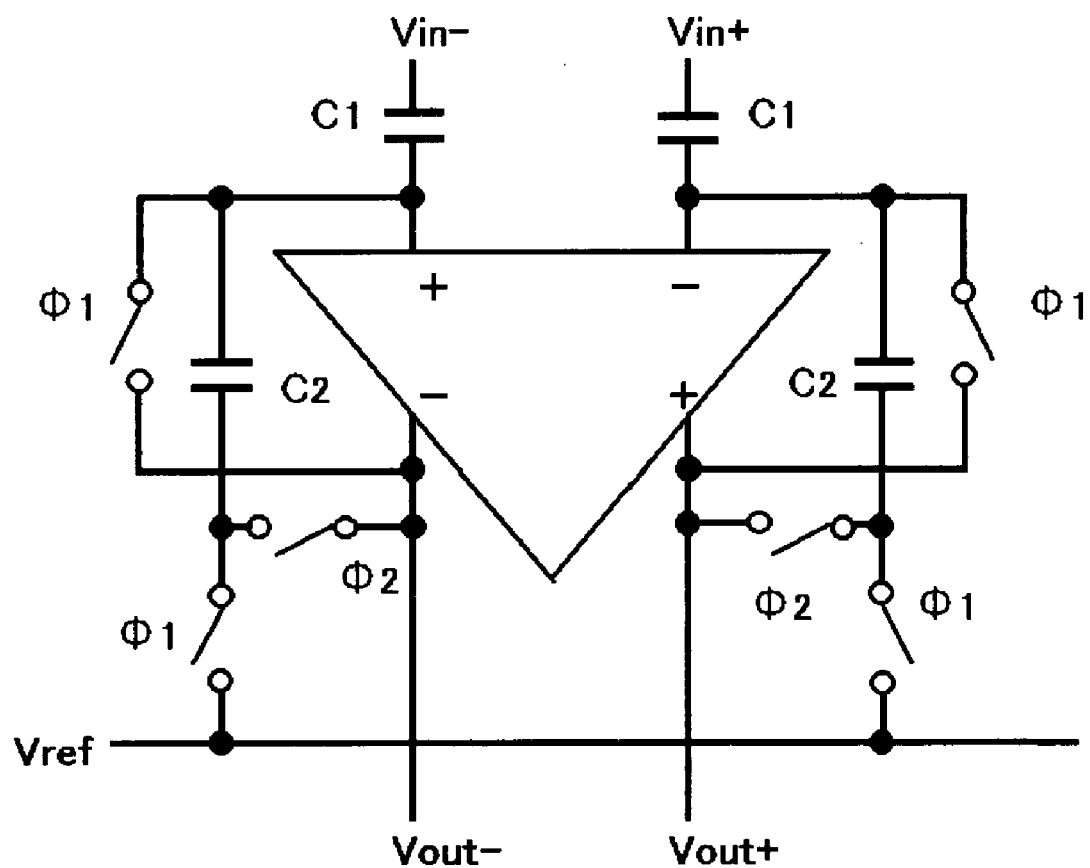
FIG. 9 is a diagram depicting a differential noise cancellation circuit.

FIG. 9 shows an example of circuits for canceling noise lining up in columns.

$V_{out}R$ and $V_{out}S$ in FIG. 8 are connected respectively to $V_{in-}$ and $V_{in+}$ in FIG. 9. In vertical reading from the image sensor, RS in FIG. 8 is set to High, and signals in one horizontal line are read out. In this case, $\phi1$ in FIG. 9 is set to High first, and the switch to which this is connected is turned ON. The capacitor C2 is connected to the reference voltage $V_{ref}$. Then $\phi1$ is set to Low, then $\phi2$ is set to High, and the capacitor C2 is connected to output. After this, RR in FIG. 8 is set to High, then signals which are in proportion to the difference of the voltages stored in the capacitors 5 and 6 in FIG. 8 and which are amplified by ratio C1/C2 are generated in the output in FIG. 9. At the same time, the fixed pattern noise which the source follower of the output in FIG. 9 generates is cancelled, and the 1/f noise can be decreased.

Figure 10:
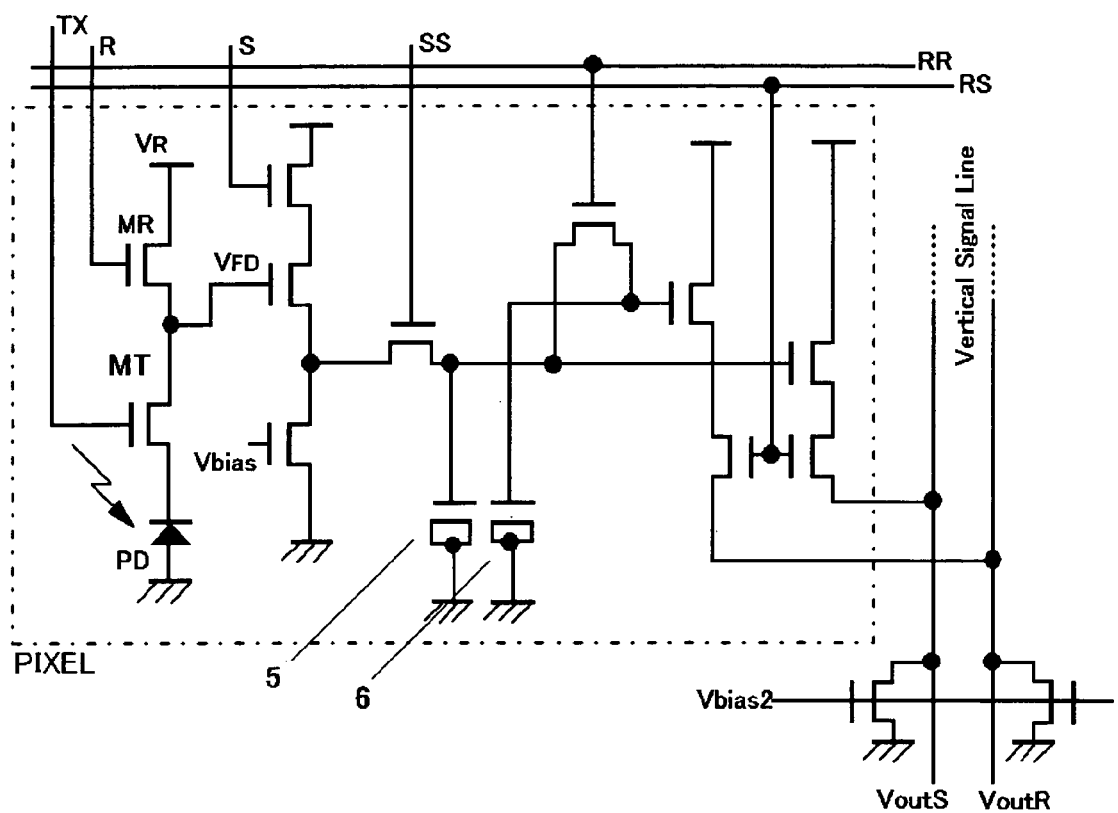
FIG. 10 is a pixel circuit which has an electronic shutter operation and noise cancellation function (No. 3)

The circuit in FIG. 8 can be simplified, as shown in FIG. 10.

This is because when the reset level of VFD is sampled, the reset level is sampled at the transistor for capacitance 6 by setting SS and RR to High simultaneously, and when the signal level of VFD (after opening TX) is sampled, the signal level is sampled at the transistor for capacitance 5 by closing RR. When the reset level is sampled, the two transistors for capacitance are connected in parallel, so random noise, due to thermal noise generated in this voltage storage circuit, can be decreased. Also compared with FIG. 8, the number of transistors can be decreased by one.

Figure 11:
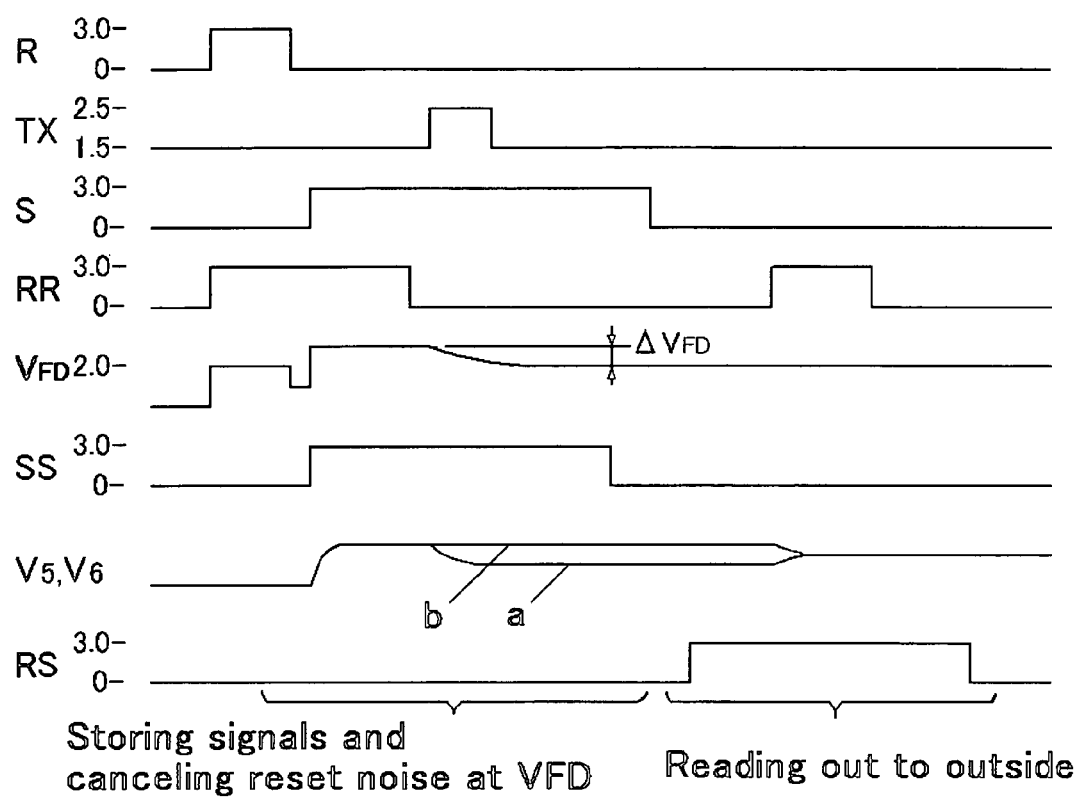
FIG. 11 is a timing chart depicting the operation of the circuit in FIG. 10.

FIG. 11 shows the operation timing. At first, the voltage of the VFD section is initialized to the reset voltage (2V in this case) by setting R to High. Then S is set to High to operate the first source follower. By this, the voltage difference of VFD appears in the output of the source follower. RR has been set to High in advance, and the transistor to which RR is connected has been turned ON, so by setting SS to High, the reset level is supplied to the transistors for capacitance 5 and 6, then by returning RR to Low, the reset level is stored (sampled and held) in the transistors for capacitance 6. Then the voltage of VFD is changed (dropped) by setting TX to High and transferring charges from the photo-diode to the VFD section. Along with this, the voltage of the transistor for capacitance 5 changes. By closing SS, the signal level generated by the charge transfer is stored (sampled and held). By the above operation, preparation for processing for storing signals generated by the charges stored in the photo-diode into the capacitor for electronic shutter and noise cancellation are finished.

The voltage stored in the two capacitors are sequentially read out to the outside to an image array, but noise cancellation processing is actually performed at this time. For the noise cancellation circuit which is disposed in an external column of the image array, the one shown in FIG. 9 can be used.

Figure 6:
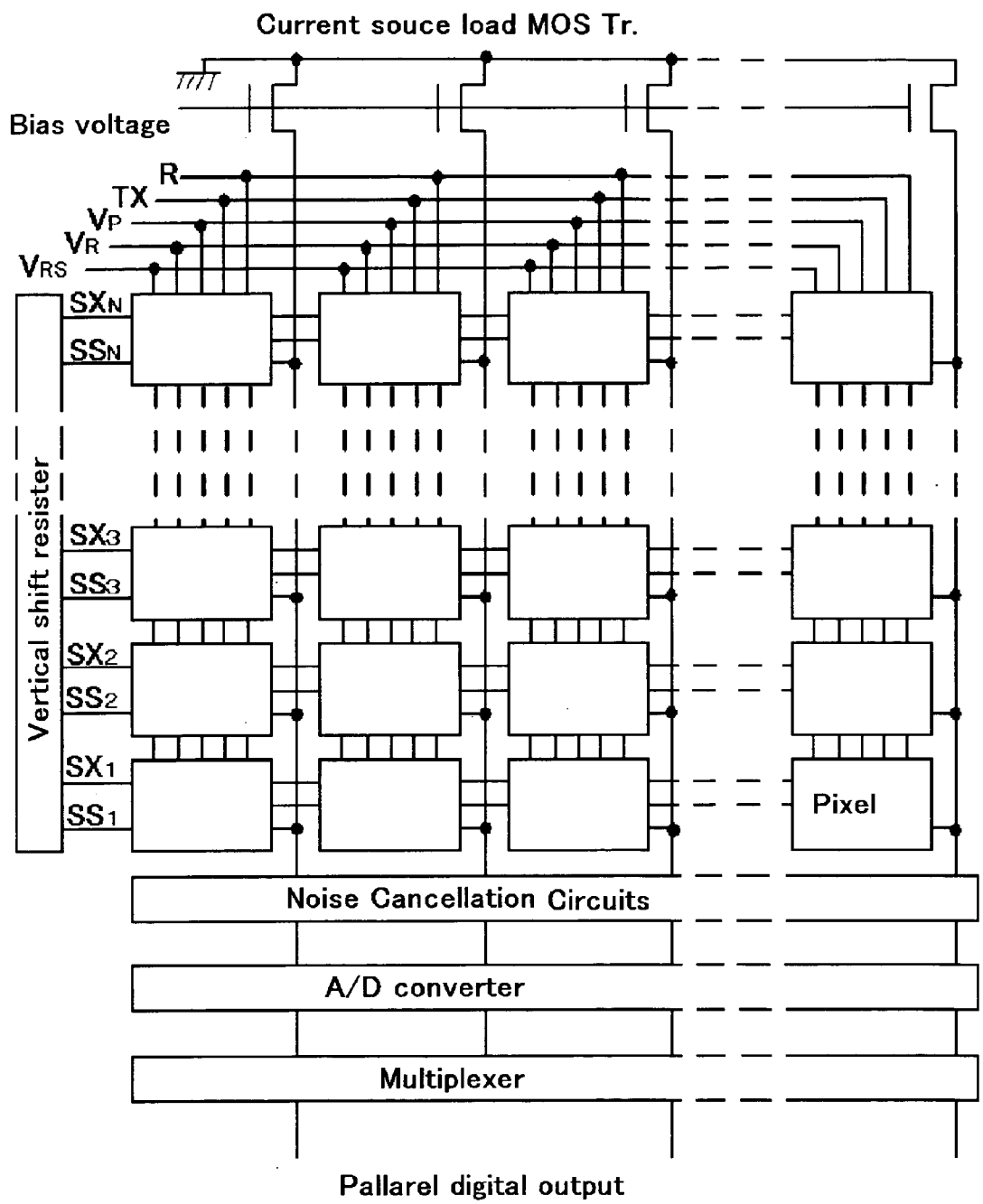
FIG. 6 is a diagram depicting a configuration of an image sensor which has an electronic shutter operation (parallel digital output)
Figure 12:
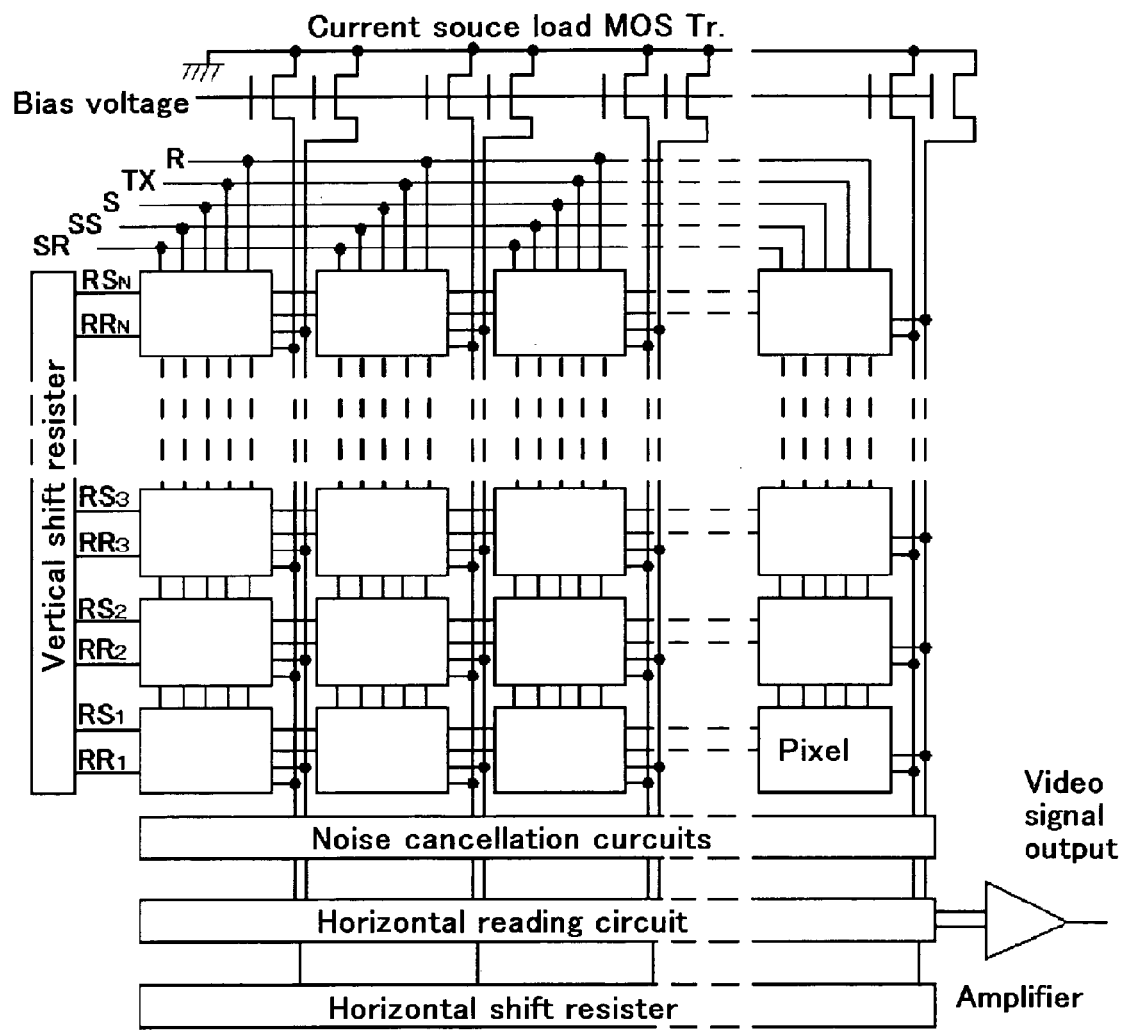
FIG. 12 is a diagram depicting a configuration of an image sensor which has an electronic shutter operation.

The general configuration of the image sensor, in this case, is as shown in FIG. 12. Signals propagate through two lines from each pixel in the vertical direction. FIG. 12 shows the case when horizontal scanning is performed after vertical reading, and image signals are read out as time series signals via one output line, but in order to read images at high-speed, a configuration similar to FIG. 6 may be used, where a plurality of high-speed A/D converters are lined up to perform A/D conversion in parallel, and signals are output in parallel via a plurality of digital signal lines.

Figure 13:
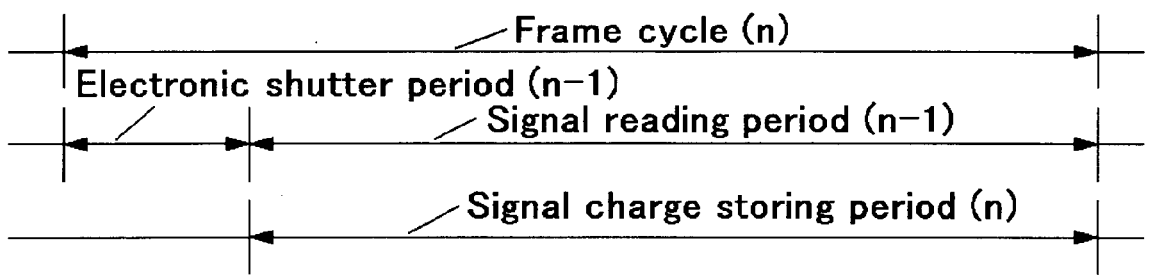
FIG. 13 shows a breakdown of an electronic shutter operation, signal reading and signal charge storing in a frame.

The time breakdown of the electronic shutter operation, signal reading and signal charge storing in a one frame cycle is as shown in FIG. 13, for example, In other words, the electronic shutter operation, signal voltage amplification and reset noise reduction processing are performed at the beginning of the n-th frame for the signal charges stored in the (n−1)-th frame, and the signals are read out from the pixel section by vertical and horizontal scanning using the remaining period of the n-th frame. At the same time, signal charge storing in the n-th frame is performed during this period.

The present invention allows implementing the electronic shutter operation, reset noise reduction and voltage amplification using simple circuits, which can be installed at the pixel section. By using the electronic shutter operation in the CMOS sensor, high-speed image capturing is possible.

What is claimed is:

1. A high-speed image sensing device, comprising in a pixel:
   means of performing photo-electric conversion;
   gate means for transferring signal charges generated by said photo-electric conversion means to the next stage;
   storing means for storing signal charges from said gate means;
   reset means for resetting signal charges of said storing means;
   memory means for temporarily storing signals from said storing means; and
   means for reducing reset noise based on the reset voltage by said reset means and voltage stored in said memory means.

2. The high-speed image sensing device according to claim 1, wherein said gate means, reset means and reset noise reduction means are constituted by the first to third MOS transistors, output of said photo-electric conversion means is connected to the source of a first MOS transistor for a transfer gate, a source of a second MOS transistor for reset is connected to the drain of said first MOS transistor, reset voltage is applied to the source of said second MOS transistor, a gate of a third MOS transistor for reset noise reduction is connected to the drain of said first MOS transistor, a first and second capacitors are connected to the source and drain of said third MOS transistor respectively between a first and second reference voltage, and first and second charging/discharging means for charging/discharging for said first and second capacitors is connected to the source and the drain of said third MOS transistor respectively.

3. The high-speed image sensing device according to claim 2, wherein the capacity of said first capacitor is set to be higher than that of said second capacitor, and voltage is amplified as charges are transferred when the signal charges stored in the first capacitor are transferred to the second capacitor, by said third MOS transistor.

4. The high-speed image sensing device according to claim 2, wherein conductivity is provided to the channel of said third MOS transistor by carriers which are different from those of the channel of said second MOS transistor.

5. The high-speed image sensing device according to claim 2, further comprising means for controlling said first and second charging/discharging means, and conductivity/non-conductivity of said first and second MOS transistors.

6. A high-speed image sensing device, comprising in a pixel:
   means for performing photo-electric conversion;
   gate means for transferring signal charges generated by said photo-electric conversion means to the next stage;
   storing means for storing signal charges from said gate means;
   reset means for resetting said signal charges;
   a first memory means for storing voltage at the reset of signal charges; and
   a second memory means for storing signal voltage from the photo-electric conversion means,
   wherein the difference of the voltages stored in the first and second memory means is calculated outside the image array, and is output as the differential voltage for canceling reset noise.

* * * * *